United States Patent Office 3,165,920
Patented Jan. 19, 1965

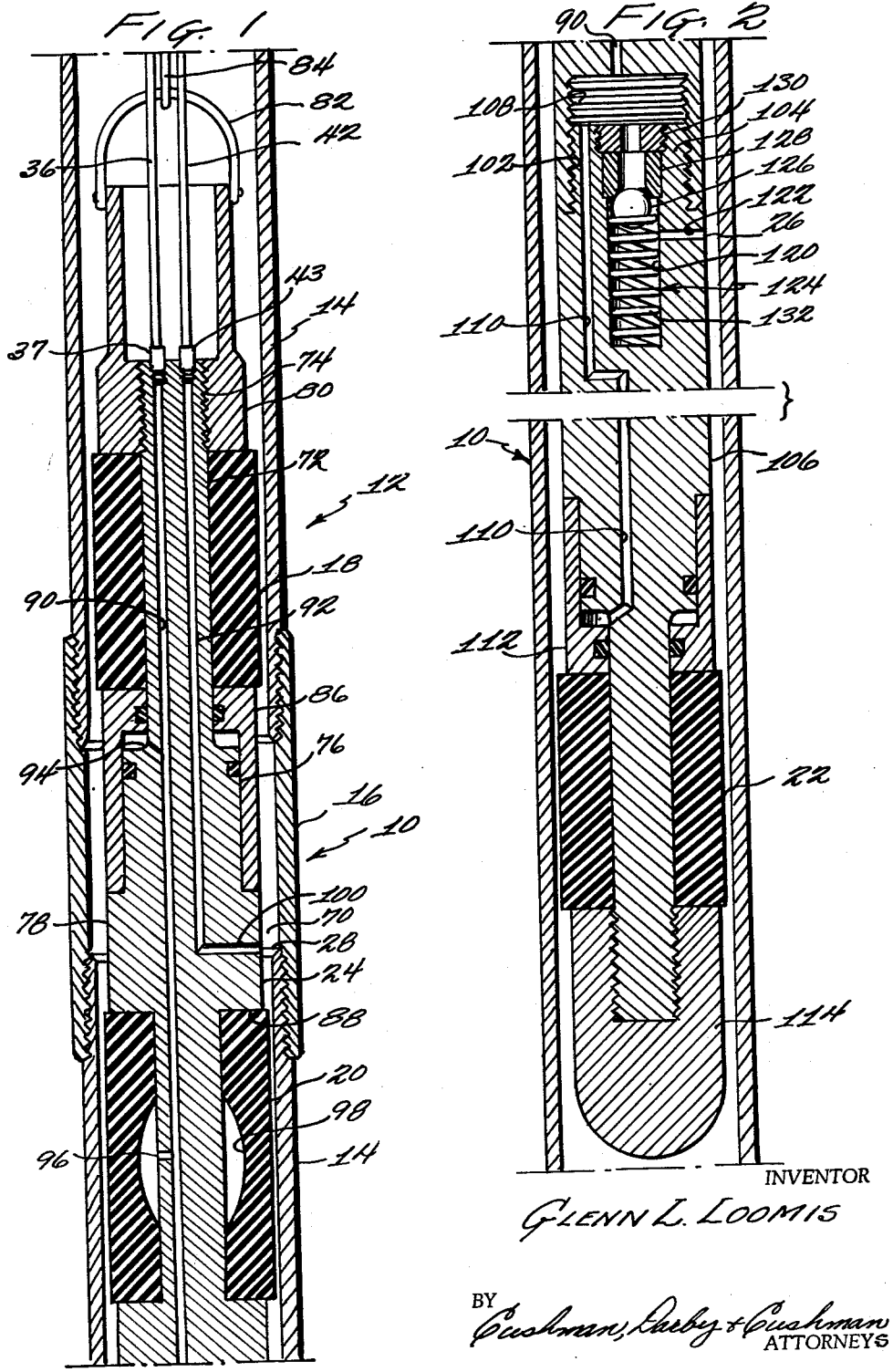

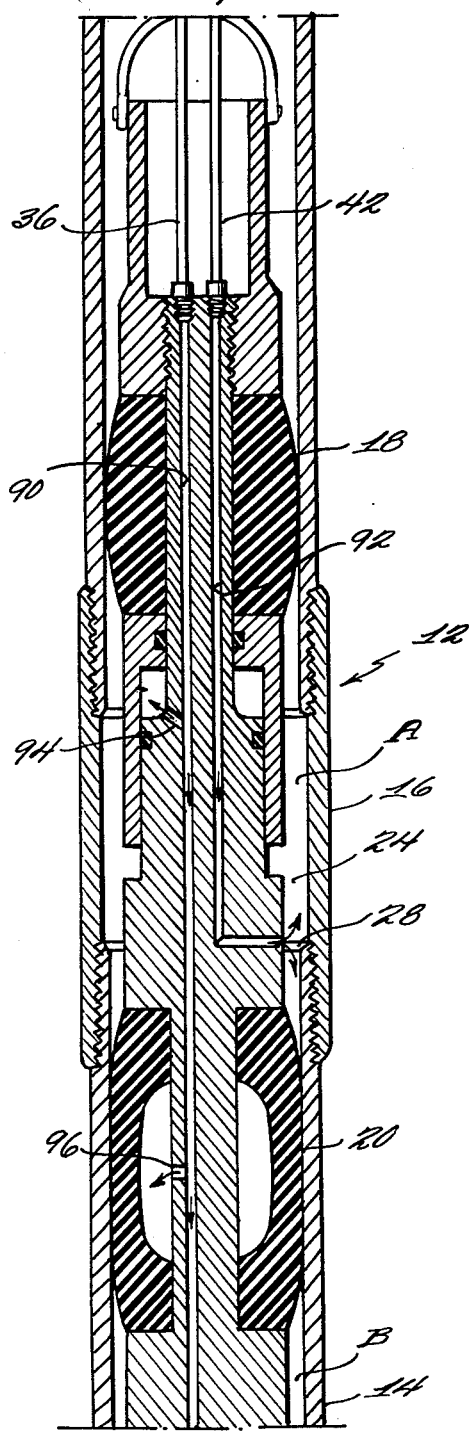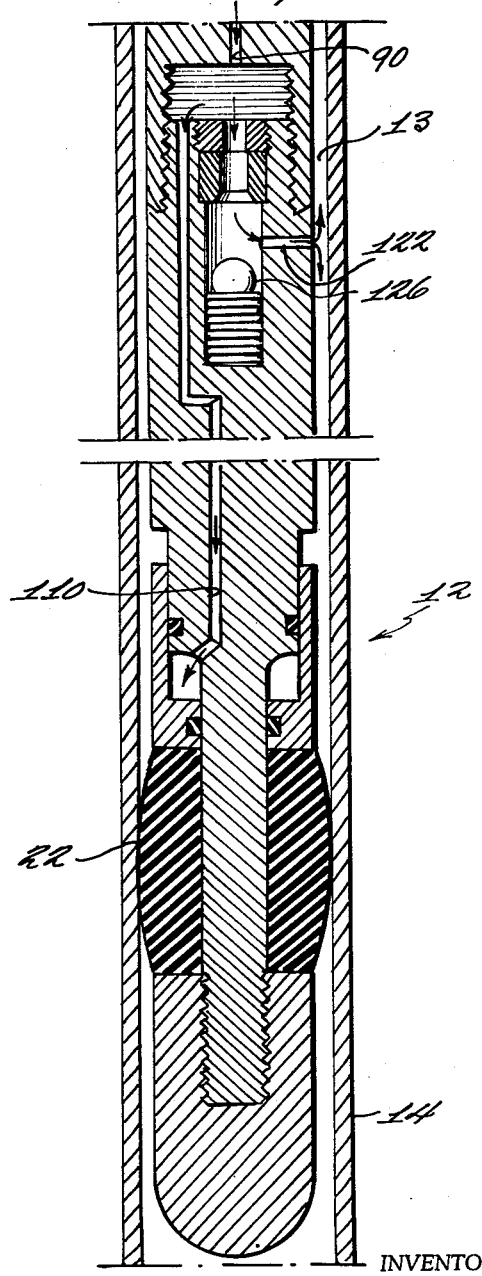

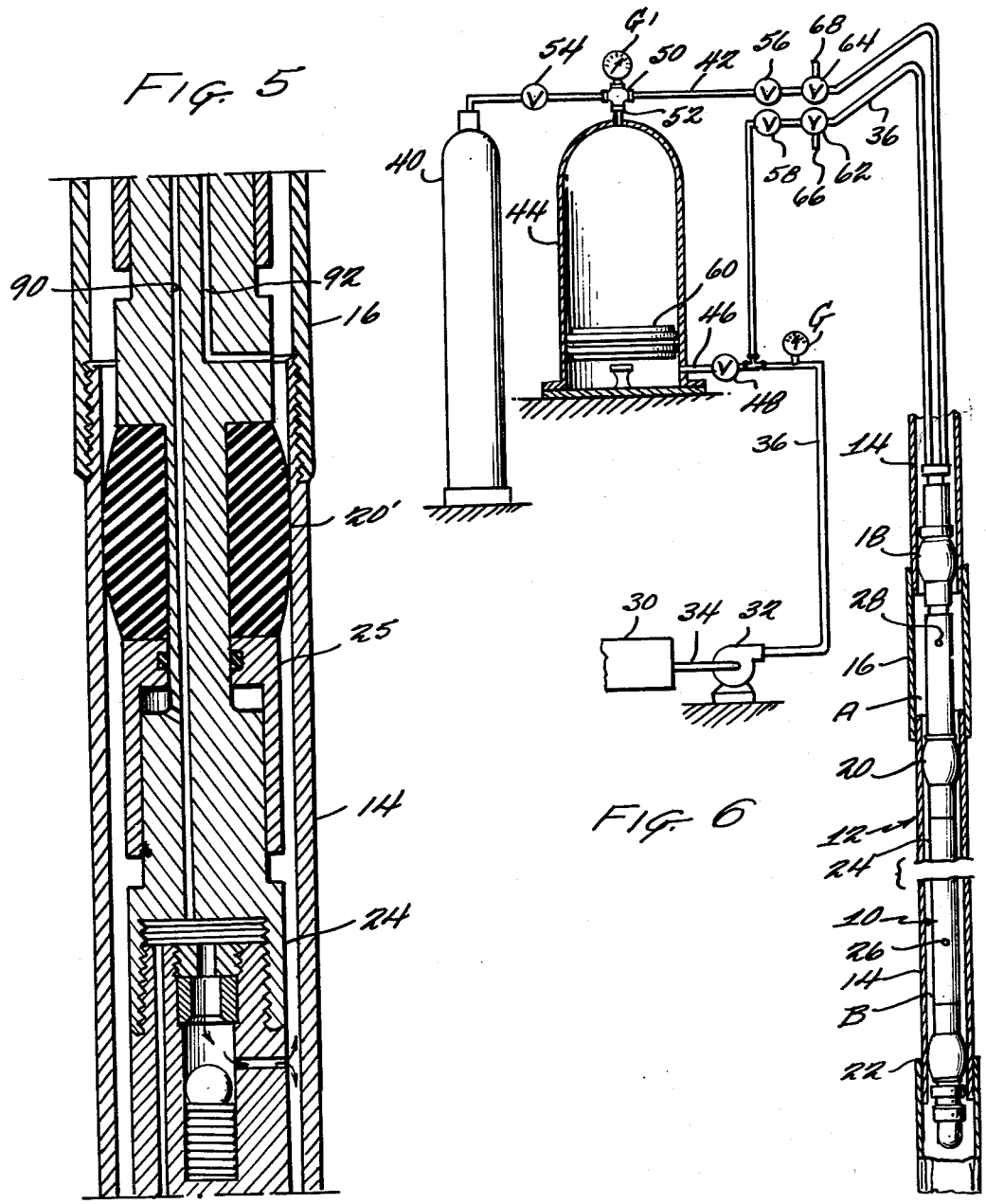

3,165,920
TOOL FOR TESTING PIPE WITH WATER AND GAS SIMULTANEOUSLY
Glenn L. Loomis, P.O. Box 728, Pasadena, Tex.
Filed July 2, 1962, Ser. No. 206,630
27 Claims. (Cl. 73—40.5)

The present invention relates to a method and apparatus for testing well pipe such as used in oil and gas well production and, more particularly, to a method and apparatus for testing two increments of well pipe simultaneouly with different fluids.

Well pipe such as casing or flow tubing is usually comprised of a plurality of stands or sections coupled together by a threaded joint. In some instances the stands are provided with male and female threads on opposite ends and one stand is threaded directly onto another stand. In other instances the stands are provided with male threads on each end and a threaded collar is used to couple the stands together. Since modern oil and gas wells extend into the earth to tremendous depths and encounter tremendous pressures, it is necessary that the flow tubing and/or casing be carefully tested as the well is being completed and from time to time after the well has been completed.

Heretofore it has been a practice to test well pipe by providing spaced barriers on either side of a threaded joint and flowing a liquid under pressure into the sealed off space between the barriers to test for leaks. In some instances efforts have been made to test one or two stands and the threaded joint or joints thereof by applying a pair of spaced barriers in the well pipe at each end of the length of the same to be tested. Liquid is flowed into the areas between the spaced barriers and pressure applied thereto to determine if the length of pipe being tested leaks.

Such prior testing procedures and apparatus have not been entirely satisfactory as it has been found leaks in the threaded joints could not always be detected by the application of a hydraulic pressure. In other words, liquid could be flowed into the area where the test is being conducted and a pressure, for example 15,000 p.s.i. could be applied to the liquid and no leak would be apparent. However, a fluid such as a gas or a liquid having a consistency or viscosity which was lower than the viscosity of the liquid used in the test could leak through the joints at the same pressure. Since some of the fluids encountered in modern oil and gas well production practices often times have such a consistency, the well pipe would leak even though tests conducted indicated that the same was leak-proof at a particular pressure.

Since it was apparent that testing well pipe solely by hydraulic pressure was unsatisfactory, efforts have been made recently to test well pipe with gaseous fluids at high pressures but such heretofore efforts proved difficult, costly and resulted in loss of time in completion of a well or returning an operating well back into service. If an entire length of tubing or stand plus its joint are subjected to a high gaseous pressure in order to make certain there was no leakage, a very dangerous condition arose due to the large volume of gas needed to fill a pipe stand of 30 feet or more. In such instances a leak in the pipe caused a complete rupture of the tubing wall, an explosion occurred endangering personnel and rig equipment. Also the use of a great volume of gas necessary to conduct such tests was expensive and the time necessary to raise the gas to the required pressures was unduly long.

An important object of the present invention is to provide a method and apparatus for testing at least two increments of well pipe simultaneously with different fluids.

Another important object of the present invention is to provide a method of and an apparatus for testing at least one stand and one joint of a well pipe wherein the stand and joint were individually but simultaneously tested with different fluids.

A further object of the present invention is to provide an improved method and apparatus for testing a joint and at least one stand of well pipe simultaneously with a liquid and gas respectively.

A still further object of the present invention is to provide an improved method and system for testing well pipe with a gas and a liquid simultaneously, the method and system contemplating utilizing liquid pressure to raise the pressure of the gas to the necessary testing pressure.

Ancillary to the preceding object it is a further object of the present invention to provide a system for testing well pipe simultaneously with different fluids such as gas and liquid, the system eliminating the necessity of using large compressors for obtaining the necessary test pressure for the gas and thus enhancing the portable use of the system.

A further object of the present invention is to provide a method and an apparatus for testing well pipe with a gaseous fluid and a liquid fluid, the method and apparatus utilizing a minimum amount of gas at a high pressure.

A further object of the present invention is to provide a method and an apparatus for testing well pipe of a completed well after the well has been in use, the method and apparatus being capable of accurately locating leaks within the well.

These and other objects and advantages will appear more fully in the following specification, claims and drawings in which:

FIGURE 1 is a vertical sectional view of the upper portion of the tester apparatus of the present invention lowered into a well pipe and prior to the testing of the well pipe;

FIGURE 2 is a vertical sectional view illustrating the lower portion of the testing apparatus of FIGURE 1, the view also showing a continuation of the well pipe to be tested;

FIGURE 3 is a vertical sectional view similar to FIGURE 1 but illustrating two of the packer elements set in the well pipe and a test being conducted on the joint between the same;

FIGURE 4 is a vertical sectional view showing a continuation of the lower portion of the tester apparatus of FIGURE 3 and showing the lowermost packer element set in the well pipe and a test being conducted between the lowermost packer element and the packer element immediately thereabove.

FIGURE 5 is a fragmentary vertical sectional view of a slightly modified form of packer element for the tester apparatus; and, FIGURE 6 is a schematic view of the system of the present invention for accomplishing the improved method, the view illustrating the tester apparatus in elevation lowered into a well pipe and testing a stand and joint of the same.

Referring now to the drawings wherein like character or reference numerals represent like or similar parts, the tester apparatus of the present invention is illustrated in FIGURES 1 and 2 inserted into a well pipe in a position ready to conduct a test on a threaded joint between two stands of the well pipe and on one of the stands. In more detail, the tester apparatus is generally designated by the numeral 10 whereas the well pipe is generally designated by the numeral 12. As shown in the drawings well pipe 12 includes a plurality of stands 14 coupled together by a threaded collar 16. The stands 14 could be of the type which are threaded directly to one another but for the purpose of this application, the more popularly used joint incorporating the threaded collar 16 is disclosed. As mentioned at the outset of the specification the purpose of the invention is to test two segments of a well pipe simultaneously with different fluids. Since it is known from experience that leaks undetected by the application of liquid under a predetermined pressure occur primarily in the threaded joint rather than in the walls of the stand 14, the present invention contemplates testing the joint increment by establishing barriers of well pipe on either side of a threaded joint and then applying a gaseous fluid under a predetermined pressure thereto whereas one stand 14 of the well pipe is simultaneously tested with a liquid under a predetermined pressure. The gas quickly detects any minute leaks in the joint whereas the liquid detects any leaks in the walls of the stand which are of a nature to impede operation of the well. As mentioned heretofore the volume of gas necessary to detect leaks in one complete stand and its joint is quite large and difficulties would be encountered in conducting the test with a large volume of gas at high pressures. The cost of gas used would be prohibitive as the stands are thirty feet or more in length. Since the wall of the stand rarely has a leak of the nature and such a leak would not impede operation of the well the described test of the stand with gas is not necessary.

The gas used in testing the well for leaks must have substantially the same consistency as fluid encountered in well flow. It has been found that a non-combustive inert gas such as nitrogen or helium provides very satisfactory results.

The improved method of testing the well pipe 12 may be best understood by referring at the outset to FIGURE 6 which schematically illustrates the entire system. As shown in FIGURE 6 the tester apparatus 10 is provided with three spaced resilient packer elements 18, 20, and 22. The packer elements 18 and 20 are closely spaced together and are adapted to be set in the well pipe on either side of the threaded joint defined by the collar 16. On the other hand, the tester apparatus 10 which has an elongated body has its third packer element 22 distantly spaced from the packer element 20 so that when the tester apparatus is inserted into the well the lowermost packer element 22 is positioned adjacent the lower end of the stand 14 immediately below the joint 16 being tested.

In FIGURE 6, the packer elements 18, 20 and 22 are illustrated set against the wall of the well pipe to define spaced barriers segregating an annular space or area A between the tester apparatus and the joint to be tested from an enlarged annular space or area B extending the length of the stand 14.

An outlet 28 is provided between the packers 18 and 20 on the tester body 24 and discharges gaseous fluid to the annular space A at a predetermined test pressure. Likewise, between the packers 20 and 22 an outlet 26 is provided in the tester body 24 for discharging a liquid under a desired test pressure to the annular space B for testing the stand 14. The testing pressures for the joint and the stand are determined by the pressures which are encountered in the well. Sometimes these pressures are in the order of 15,000 p.s.i. or greater. Usually the stand and joint are tested at the same pressure.

At the surface of the well a source of supply for liquid under pressure 30 is provided, the liquid utilized being water or salt water. The source of supply 30 communicates with a pump 32 by means of a conduit 34, the outlet of the pump 32 being connected to a conduit 36 which extends to the tester apparatus 10 and is connected thereto as will be explained in more detail later in the specification. It will suffice at this time to state, the conduit 36 supplies liquid under pressure to simultaneously set the packers 18, 20 and 22 and after the packers are set the liquid from the conduit 36 flows through the tester body 24 and is discharged through the opening 26 to annular space B to test the wall of the stand 14.

A source of gas supply 40 such as the usual gas bottle containing gas under a pressure of 2,500 p.s.i. maximum is utilized. A conduit 42 connects the source of gas supply 40 to the tester apparatus 10 and gas can flow from the conduit through the tester body 24 and be discharged through the opening 28 into the annular area A in order to test the threads of the collar joint 16.

Since bottled gas is furnished at relatively low pressure such as a 2,500 p.s.i. maximum, it is necessary to boost this pressure of gas up to the test pressure, for example 15,000 p.s.i. Utilization of a compressor for boosting the gas pressure up to a test pressure is not practical at a well site as such compressors are extremely large and cumbersome. Also, such compressors are quite costly.

The present invention contemplates utilizing the test pressure of the liquid as a means of quickly and inexpensively boosting the pressure of the bottled gas. In more detail, a closed cylinder 44 is provided at the surface of the well, the cylinder having one end connected by conduit 46 to the conduit 36. A valve 48 is provided in the conduit 46. A T-fitting 50 provided in the conduit 42 connects the other end of the interior of the cylinder 44 to the source of gas supply 40 by means of a conduit 52. A valve 54 is provided between the source of supply 40 and the T-fitting 50 in the conduit 42 whereas a second valve 56 is provided between the T-fitting 50 and the testing apparatus 10. Conduit 36 is provided with a valve 58 between its point of connection to the tester apparatus 10 and its point of communication with the cylinder 44. As shown in FIGURE 6, the cylinder 44 has a floating piston 60, such piston being necessary where the gas is of the type that has a high water absorption rate. When a gas is utilized that does not have a high absorption rate, no piston is necessary.

At a convenient point in each of the conduits 36 and 42, selectively operable pressure relief valves 62 and 64 are provided. The valves 62 and 64 normally allow flow of fluid through the conduits to the testing apparatus 10 but are capable of being closed to the flow from the source of supply 30 and 40 while relieving the conduits 36 and 42 on the downstream end of the valves to atmosphere through the ducts 66 and 68 respectively.

When a test of two increments of well pipe is to be conducted the testing tool 10 is lowered to the desired position within the well pipe 12. Valves 48 and 58 are closed as well as valve 56. Valve 54 is opened and gas from the source of supply 40 is allowed to flow into the cylinder, forcing the piston 60 downwardly as shown in FIGURE 6. Suitable pressure relief valves are provided in the cylinder beneath the piston so that a maximum volume of gas can flow into the cylinder 44. Once the cylinder 44 has been filled with gas at a pressure, for example 2,500 p.s.i., the valve 54 is closed and the valve 48 is opened and liquid is flowed beneath the piston at an increased pressure, for example 15,000 p.s.i. This causes the piston to move upwardly, compressing the gas above the same and raising the pressure of the gas until it equalizes with the pressure of the liquid below the piston. When this condition occurs, valve 58 is opened and liquid is allowed to flow through the line 36 to first simultaneously expand the packer elements 18, 20 and 22 so that they set within the well pipe. Once the packer elements have been set, the valve 56 in the gas conduit is opened and gas from above the piston 60 in cylinder 44 is allowed to flow at its boosted or increased pressure into the smaller sealed-off annular space A to test the threaded joint 16. At the same time, liquid flows through the outlet 26 into the annular space B between the packers 18 and 20 at substantially the same pressure. The operator by observing the pressure gauges G and $G_1$ can see the pressure build to the desired amount and then determine whether or not there is a leak in either the joint 16 or the stand 14. If there is a drop of pressure on either gauge, the operator immediately knows where the leak is located.

Once the test of a joint 16 and stand 14 has been completed the valve 56 is closed as well as the valve 58 and the valves 62 and 64 are open to relieve the pressures of the liquid and gas respectively from within the testing tool to atmosphere. The packers 18, 20 and 22 are then relaxed and any liquid trapped between the packers 20 and 22 drops by gravity past the packer 22 into the well. The testing apparatus is then moved to a different position in the well pipe and the above test is repeated.

In more detail, it is preferable to open the valve 64 prior to the opening of the valve 62 as it is desirable to relieve the gas pressure and completely bleed off the gas before the liquid pressure is released. If both the liquid and gas pressures are relieved simultaneously, the packers would be released and the rapidly expanding gas would have a tendency to blow the test liquid out of the well as well as the tool itself. Also, should there be a column of mud standing just below the tool, the gas would be forced by this block to return upwardly at a considerable force sufficient to blow the tool out of the well causing damage to personnel and property.

Referring back to FIGURES 1 through 4 inclusive, the apparatus 10 of the present invention includes the elongated tester body 24 which is provided with the three spaced packer elements 18, 20 and 22. The tester body 24 has a maximum diameter substantially less than the diameter of the well pipe to be tested whereas the packer elements 18, 20 and 22 have a relaxed diameter less than the inside diameter of the well pipe. This permits the testing apparatus 10 to be easily raised or lowered within the well pipe. In more detail tester body 24 includes an upper section 70 having an upwardly extending elongated stem 72 of reduced diameter, the stem 72 being threaded as indicated at 74. Section 70 has an intermediate portion 76 between the stem 72 and its center portion 78 of maximum diameter. A back-up nut or fitting 80 is threaded onto the end of the stem 72 and is provided with a bail 82 by which the usual grapple 84 can engage for raising or lowering the testing apparatus.

Packer element 18 is positioned between the back-up nut 80 and a cylindrical cup-shaped piston 86 which slides on the intermediate portion 76. Section 70 has an annular reduced portion 88 for receiving the second packer element 20. As clearly shown in FIGURE 1 the conduits 36 and 42 are connected at 37 and 43 to the stem and communicate with passages 90 and 92 respectively. The passage 90 communicates with a first transversely extending passage 94 which opens beneath the head of piston 86 and a second transversely extending passage 96 which communicates with an annular cavity or recess 98 provided on the interior of the packer element 20. Passage 92 terminates in the enlarged portion 78 of section 70 and communicates with a laterally extending passage 100 which opens to the exterior of the tester apparatus as indicated at 28 between the upper packer element 18 and the intermediate packer element 20.

The lower end of section 70 as illustrated in FIGURE 2, is provided with an enlarged threaded bore 102 which is adapted to receive the threaded end 104 of a lower section 106 of the tester body 24. It will be noted that the passage 90 opens to a space 108 within the bore 102 and a passage 110 in the lower section 106 extends downwardly from the end 104 and opens beneath a cylindrical cup-shaped piston 112 substantially identical to the piston 86. Liquid under pressure flowing beneath the pistons 86 and 112 causes the same to move and compress the packer elements 18 and 22 longitudinally against their respective back-up nuts 80 and 114 and, thus, expand the packer elements transversely into sealing engagement in a manner similar to that disclosed in my United States Patent No. 2,841,007 issued July 1, 1958. On the other hand, the packer element 20 is expanded in a manner similar to that disclosed in my prior United States Patent No. 2,807,955 issued October 1, 1957.

The upper end 104 of the lower section 106 is provided with a bore 120 closed at its lower end. The bore 120 is in open communication with the exterior of the tester body by means of a transversely extending passage 122 opening at 26. A pressure responsive valve generally designated at 124 is carried in the bore 120 and includes a ball valve element 126 arranged to seat against a valve seat 128 held in place by a nut 130 having a central passage therethrough. A spring 132 normally urges the ball into seating engagement with the valve seat 126. By utilizing springs 132 with different spring constants, the valve 124 can be adjusted to open at a desired predetermined pressure.

Referring now to FIGURES 3 and 4 which illustrate a test being performed in the well pipe 12 it will be noted that liquid has flowed through the conduit 36 into the passage 90 and out of the passages 94, 96 and 110 to cause each of the packer elements 18, 20 and 22 respectively to set within the well pipe 12. Once the packer elements 18, 20 and 22 have set, the pressure builds up in the line 36, passage 90 and causes the ball 126 to unseat as shown in FIGURE 4. The liquid flows out of the passage 122 into the annular space B between the packers 20 and 22 and tests the wall of the stand 14 for leaks.

After the packers 18, 20 and 22 have set as explained above, gas under pressure is flowed through the conduit 42 and passage 92 out of the opening 28 in the tester body 24 into the annular space A between the packers 18 and 20 so as to test the threaded joint formed by the collar 16.

Referring now to FIGURE 5, a fragmentary portion of the tester apparatus of FIGURES 1 and 2 is shown with a modified packer element 20' used in place of the inflatable packer element 20. The packer element 20' is of the same type as the packer elements 18 and 22 of FIGURES 1 through 4 in that the tester body 24 is provided with a piston 25 for compressing the packer element and expanding the same transversely. While the invention has been described utilizing resilient packer elements made from a elastomeric material, such as rubber, synthetic rubber or the like, the packer elements being either the inflatable type or the piston actuated type, it is of course within the scope of the present invention that other types of packer elements could be utilized to provide the spaced barriers necessary to segregate two segments of a well pipe to be tested. For example, swab type packers could be used which have a friction fit with the well pipe.

The method and system of testing described above fully accomplishes the objects and advantages of the present invention. However, it is, of course, within the scope of the present invention that certain modifications in structure and slight variations in method and procedure of testing may be made without departing from the primary objects of the invention. Therefore, the terminology used in this specification is for the purpose of description and not limitation as the scope of the invention is defined in the claims.

What is claimed is:

1. A method of testing a well pipe for leaks, the well pipe being made up of a plurality of stands coupled together in sequence by threaded joints, comprising the steps of: establishing at least three spaced fluid barriers within the well pipe, two of the barriers being established immediately adjacent each side of a threaded joint and the third barrier being established in the stand coupled by the joint immediately adjacent the next threaded joint in the sequence to define respectively a first space for testing one joint and a second space for testing one adjacent joint stand; flowing a gaseous fluid into the first space and applying a measurable pressure thereto to test the joint; flowing a liquid fluid into the second space and applying a measurable pressure thereto to test the stand;

and observing the pressures of the gaseous and liquid fluids to see if a leak causes them to decrease; and if no leak is evident repeating the test with respect to the next adjacent joint and the next stand.

2. A method of testing a well pipe for leaks, the well pipe being made up of a plurality of stands coupled together in sequence by threaded joints, comprising the steps of: simultaneously establishing at least three spaced fluid barriers within the well pipe, two of the barriers being established immediately adjacent each side of a threaded joint and the third barrier being established in the stand coupled by the joint immediately adjacent to the next threaded joint in the sequence to define respectively a first space for testing one joint and a second space for testing one adjacent joined stand; flowing a gaseous fluid into the first space and applying a measurable pressure thereto to test the joint; flowing a liquid fluid into the second space and applying a measurable pressure thereto to test the stand; and observing the pressures of the gases and liquid fluids to see if a leak causes them to decrease; and if no leak is evident relieving the pressures and releasing the spaced barriers to allow the liquid to fall by gravity; and then repeating the test with respect to the next adjacent joint and the next stand.

3. The method of testing the well pipe as claimed in claim 2 wherein the gaseous fluid and the liquid fluid are simultaneously measured and observed in the first space and second space respectively.

4. The method of testing a well pipe as claimed in claim 2 wherein the gaseous fluid is an inert gas.

5. The method as claimed in claim 4 wherein the inert gas is helium.

6. The method as claimed in claim 4 wherein the inert gas in nitrogen.

7. The method as claimed in claim 4 wherein the inert gas has a consistency substantially similar to expected consistency of well production flow.

8. A method of testing a well pipe for leaks, the well pipe being made up of a plurality of stands coupled together in sequence by threaded joints, comprising the steps of: establishing at least three spaced barriers within the well pipe, two of the barriers being established immediately adjacent each side of a threaded joint and the third barrier being established in the stand coupled by the joint immediately adjacent the next threaded joint in the sequence to define respectively a first space for testing one joint and a second space for testing one adjacent joined stand; utilizing a source of gaseous fluid under pressure for flowing into the first space; utilizing a source of liquid under a pressure higher than the pressure of the source of gas for flowing into the second space; increasing the pressure of the gaseous fluid by utilizing the pressure of the liquid to boost the same; flowing the gaseous fluid into the first space at the increased pressure; flowing the liquid fluid into the second space; measuring the pressures of the gaseous fluid and the liquid fluid respectively in the first and second space and observing the measured pressures to see if a leak causes either of them to decrease; and if no leak is evident repeating the test with respect to the next adjacent joint and the next stand.

9. The method as claimed in claim 8 wherein the gaseous fluid is a non-combustive inert gas having a consistency of expected well production flow.

10. The method as claimed in claim 8 wherein the three spaced fluid barriers are established simultaneously by utilizing fluid pressure and wherein the testing of the joint and the one adjacent joined stand is accomplished simultaneously.

11. The method of testing well pipe as claimed in claim 8 wherein the liquid fluid is water.

12. The method of testing well pipe as claimed in claim 8 wherein the pressures of the gaseous and liquid fluids in the first and second spaces respectively is substantially equal to each other.

13. In a system for testing at least one stand and one threaded joint of a well pipe made up of a plurality of stands coupled together in sequence by threaded joints; an elongated testing tool for insertion into the well pipe, said testing tool having a pair of closely spaced packer elements thereon adapted to be set on either side of the joint to be tested and a third packer element thereon distantly spaced from one of said pair of packer elements and adapted to be set adjacent an end of the stand to be tested opposite the end of the joint; means for flowing a gas into the test tool and discharging the same externally thereof between said pair of closely spaced packer elements; means for flowing a liquid into the testing tool independently of said last-mentioned means and discharging the liquid externally thereof between the third packer element and one of said pair of packer elements; and means to measure pressure of gas and liquid flowed into the testing tool by said first and second means.

14. A system as claimed in claim 13 in which said means for flowing gas includes a low pressure source of gas and in which said means for flowing a liquid includes a high pressure source of liquid, and means for boosting the pressure of gas by utilizing the pressure of liquid flowed by said high pressure source.

15. A system as claimed in claim 14 in which said last-mentioned means includes a cylinder in selective open communication with said means for flowing gas and in selective open communication with said means for flowing liquid.

16. A system as claimed in claim 15 in which said cylinder includes a piston movable therein and separating gas and liquid flowed therein.

17. In a system for testing at least one stand and one threaded joint of a well pipe made up of a plurality of stands coupled together in sequence by threaded joints: a testing tool for insertion into the well pipe; said testing tool having a pair of closely spaced packer elements thereon adapted to be set on either side of the joint to be tested and a third packer element thereon distantly spaced from one of said pair of said packer elements and adapted to be set adjacent an end of the stand to be tested opposite the end of the joint to be tested; a source of gas under pressure; gas conduit means connecting said source of gas with said tool and including a passage in said tool opening to the exterior thereof between said closely spaced packer elements; a source of liquid under pressure higher than the pressure of the source of gas; liquid conduit means connecting said source of liquid to said tool and including a passage in said tool opening to the exterior thereof between said third packer element and the one of said pair of packer elements; means for boosting pressure of gas flowed to said tool through said gas conduit means, said last-mentioned means including a cylinder having one end in selective communication with said gas conduit means for the other end in selective communication with said liquid conduit means; and means to measure pressure of gas and liquid flowed into the testing tool to respectively test the joint and stand.

18. A system as claimed in claim 17 wherein said cylinder includes a piston movable therein for segregating the gas and liquid therein.

19. A system as claimed in claim 17 in which said means for boosting the gas pressure further includes selectively operable valve means in said gas conduit means upstream to a point of connection of the cylinder with said gas conduit means and selectively operable valve means in said liquid conduit means upstream of a point of connection of said cylinder with said liquid conduit means.

20. A system as claimed in claim 19 including further valve means in said gas conduit means and said liquid conduit means selectively operable to open said gas conduit means and said liquid conduit means to atmosphere.

21. A testing tool for testing two increments of well pipe simultaneously with different fluids comprising an elongated tester body having an external diameter smaller than the inside diameter of the well pipe to be tested, three spaced packer elements carried by said tester body and settable in the well pipe to segregate first and second increments of the well pipe to be tested, means for flowing a first fluid at a measurable pressure through said tester body and discharging the same externally of said tester body into a space between two of said packer elements to test the first increment of well pipe and means for flowing a second fluid at a measurable pressure through said tester body and discharging the same externally of the tester body into a second space between two of said packer elements to test the second increment of well pipe.

22. The testing tool as claimed in claim 21 in which said three packer elements are fluid expansible and in which one of said means for flowing the first and second fluids includes means to cause the fluid flowed thereby to simultaneously expand and set said three packer elements.

23. The testing tool as claimed in claim 22 in which the said one of said means for flowing the first and second fluids includes a pressure responsive valve operable at a predetermined pressure higher than the pressure necessary to set said packer elements, said pressure responsive valve when opened permitting flow of fluid to discharge externally of the tester body to test the respective increment of well pipe.

24. A testing tool for testing a threaded joint between stands of a well pipe and at least one of the stands of the well pipe simultaneously with different fluids at a measurable pressure comprising: an elongated tester body having an external diameter smaller than the inside diameter of the well pipe to be tested; three spaced packer elements carried by said tester body, two of said packer elements being closely spaced apart a distance slightly greater than the joint to be tested and the third of said packer elements being distantly spaced from said two packer elements a distance substantially equal to the length of the stand to be tested; a source of liquid; a source of gas; means to flow liquid from said source into said tester body for causing said three packer elements to simultaneously set into engagement with the wall of the well pipe, said last-mentioned means including pressure responsive means operable at a pressure higher than pressure necessary to set said packers for permitting liquid in said tester body to flow to the exterior thereof to the space between the distantly spaced packer elements; and means to flow gas from said source to said tester body and discharge the same exterior of the tester body to the space between the closely spaced apart packer elements.

25. A testing tool for testing a threaded joint between stands of a well pipe and at least one of the stands of the well pipe simultaneously with different fluids at a measurable pressure comprising an elongated tester body having an external diameter smaller than the inside diameter of the well pipe to be tested, said tester body having a length longer than the length of the joint and the stand being tested, three spaced packer elements carried by said tester body, two of said packer elements being spaced apart a distance slightly greater than the joint to be tested and the third of said packer elements being distantly spaced from one of said two packer elements a distance substantially equal to the length of the stand to be tested, fluid operable means to cause said packer elements to simultaneously set into engagement with the wall of the well pipe to segregate the threaded joint and the stand to be tested from each other, means for flowing a first fluid under pressure through said body element and including a passage communicating with said fluid operable means adjacent each of said packer elements, means to flow the first fluid from said passage to the exterior of said tester body between two of said packer elements and including a pressure responsive valve and a passageway, said pressure responsive valve being operable at a pressure higher than the pressure necessary to set said packer elements, and means for flowing a second fluid through said tester body and discharge the same between two other of said packer elements, said last-mentioned means including a continuously open passage in said tester body.

26. A testing tool as claimed in claim 25 in which the means to flow the first fluid to the exterior of the tester body has its passageway opening between the distantly spaced packer elements.

27. A method of testing a well pipe for leaks, the well pipe being made up of a plurality of stands coupled together in sequence by threaded joints, comprising the steps of: establishing at least two spaced fluid barriers within the well pipe by application of liquid under a predetermined pressure to define at least one space within the well pipe for testing a section of the same; flowing a gaseous fluid into the space between the established barriers and applying a measurable pressure thereto to test the well pipe; observing the pressure of the gaseous fluid to see if a leak in the well pipe causes it to decrease; relieving the pressure on the gaseous fluid while maintaining the spaced barriers; after the pressure of the gaseous fluid has been completely bled, and then relieving the liquid pressure to release the spaced barriers; and if no leak was evident, repeating the test with respect to another section of well pipe.

References Cited by the Examiner
UNITED STATES PATENTS

| | | | |
|---|---|---|---|
| 2,192,155 | 2/40 | Schuldt | 73—40.5 |
| 2,953,919 | 9/60 | Potts | 73—40.5 |
| 3,035,440 | 5/62 | Reed | 73—40.5 X |

ISAAC LISANN, *Primary Examiner.*